US012381753B2

United States Patent
Yoo et al.

(10) Patent No.: US 12,381,753 B2
(45) Date of Patent: Aug. 5, 2025

(54) ELECTRONIC DEVICE, AND METHOD FOR CONTROLLING SAME

(71) Applicant: Samsung Electronics Co., Ltd., Suwon-si (KR)

(72) Inventors: Juhwan Yoo, Suwon-si (KR); Chuljoo Kim, Suwon-si (KR); Gihun Chang, Suwon-si (KR); Seolim Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 514 days.

(21) Appl. No.: 17/738,593

(22) Filed: May 6, 2022

(65) Prior Publication Data

US 2022/0264670 A1 Aug. 18, 2022

Related U.S. Application Data

(63) Continuation of application No. PCT/KR2020/014724, filed on Oct. 27, 2020.

(30) Foreign Application Priority Data

Nov. 12, 2019 (KR) ........................ 10-2019-0144098

(51) Int. Cl.
*H04L 12/28* (2006.01)
*H04B 7/155* (2006.01)
(Continued)

(52) U.S. Cl.
CPC ......... *H04L 12/2807* (2013.01); *H04B 7/155* (2013.01); *H04L 67/12* (2013.01);
(Continued)

(58) Field of Classification Search
CPC ......... H04W 4/30–38; H04W 4/50–80; H04W 40/22; H04W 52/46; H04W 88/04; H04W 88/00–06; H04B 7/155; H04L 12/2803
See application file for complete search history.

(56) References Cited

U.S. PATENT DOCUMENTS

| 9,021,443 B1 | 4/2015 | Lachwani et al. |
| 9,274,935 B1 | 3/2016 | Lachwani et al. |

(Continued)

FOREIGN PATENT DOCUMENTS

| CN | 105933852 B | 7/2019 |
| JP | 2005-531961 A | 10/2005 |

(Continued)

OTHER PUBLICATIONS

Korean Office Actiondated Feb. 11, 2025, issued in the Korean Patent Application No. 10-2019-0144098.

*Primary Examiner* — San Htun
(74) *Attorney, Agent, or Firm* — Jefferson IP Law, LLP

(57) ABSTRACT

A method for controlling an electronic device is provided. The method includes obtaining a list including at least one relay device for performing initial connection with an external device, and displaying the list on a display, when one relay device is selected from the list, transmitting a request for access to the selected relay device to the selected relay device, when access approval information is received from the relay device, displaying, on the display, a list of at least one external device capable of performing connection by means of the relay device, when one external device is selected from the list of the at least one external device, receiving, from the selected external device, an authentication request for the selected external device, and when a user input is received in response to the authentication request, performing the initial connection with the selected external device.

14 Claims, 15 Drawing Sheets

(51) Int. Cl.
  *H04L 67/12* (2022.01)
  *H04W 4/80* (2018.01)
  *H04W 12/06* (2021.01)
  *H04W 40/22* (2009.01)
  *H04W 76/12* (2018.01)
  *H04W 88/04* (2009.01)
  *H04W 84/18* (2009.01)

(52) U.S. Cl.
  CPC ............. *H04W 4/80* (2018.02); *H04W 12/06* (2013.01); *H04W 40/22* (2013.01); *H04W 76/12* (2018.02); *H04L 12/2803* (2013.01); *H04W 84/18* (2013.01)

(56) References Cited

U.S. PATENT DOCUMENTS

| | | |
|---|---|---|
| 9,886,374 B1 | 2/2018 | Kuo et al. |
| 9,952,985 B2 | 4/2018 | Han |
| 10,313,862 B2 | 6/2019 | Lau et al. |
| 11,082,856 B2 | 8/2021 | Hwang et al. |
| 11,178,232 B2 | 11/2021 | Yu et al. |
| 2004/0203354 A1 | 10/2004 | Yue |
| 2007/0123166 A1 | 5/2007 | Sheynman et al. |
| 2010/0104292 A1* | 4/2010 | Na .................. H04N 21/42204 398/115 |
| 2015/0351145 A1* | 12/2015 | Burks .................. H04L 63/102 455/41.3 |
| 2016/0344814 A1* | 11/2016 | Yeom ....................... H04W 4/14 |
| 2016/0359629 A1* | 12/2016 | Nadathur .................. H04L 9/14 |
| 2017/0105131 A1* | 4/2017 | Song ....................... H04W 4/80 |
| 2017/0187447 A1* | 6/2017 | Cho .................... H04B 7/15507 |
| 2017/0195136 A1* | 7/2017 | Ghosh .................... H04L 47/72 |
| 2018/0220476 A1 | 8/2018 | Jung et al. |
| 2019/0037617 A1* | 1/2019 | Kapatralla .......... H04L 65/1073 |
| 2020/0366516 A1 | 11/2020 | Moon et al. |

FOREIGN PATENT DOCUMENTS

| | | |
|---|---|---|
| KR | 10-1274853 B1 | 6/2013 |
| KR | 10-2014-0054970 A | 5/2014 |
| KR | 10-1496649 B1 | 3/2015 |
| KR | 10-1716855 B1 | 3/2017 |
| KR | 10-2017-0097835 A | 8/2017 |
| KR | 10-1844012 B1 | 3/2018 |
| KR | 10-2018-0092535 A | 8/2018 |
| KR | 10-2001221 B1 | 7/2019 |

* cited by examiner

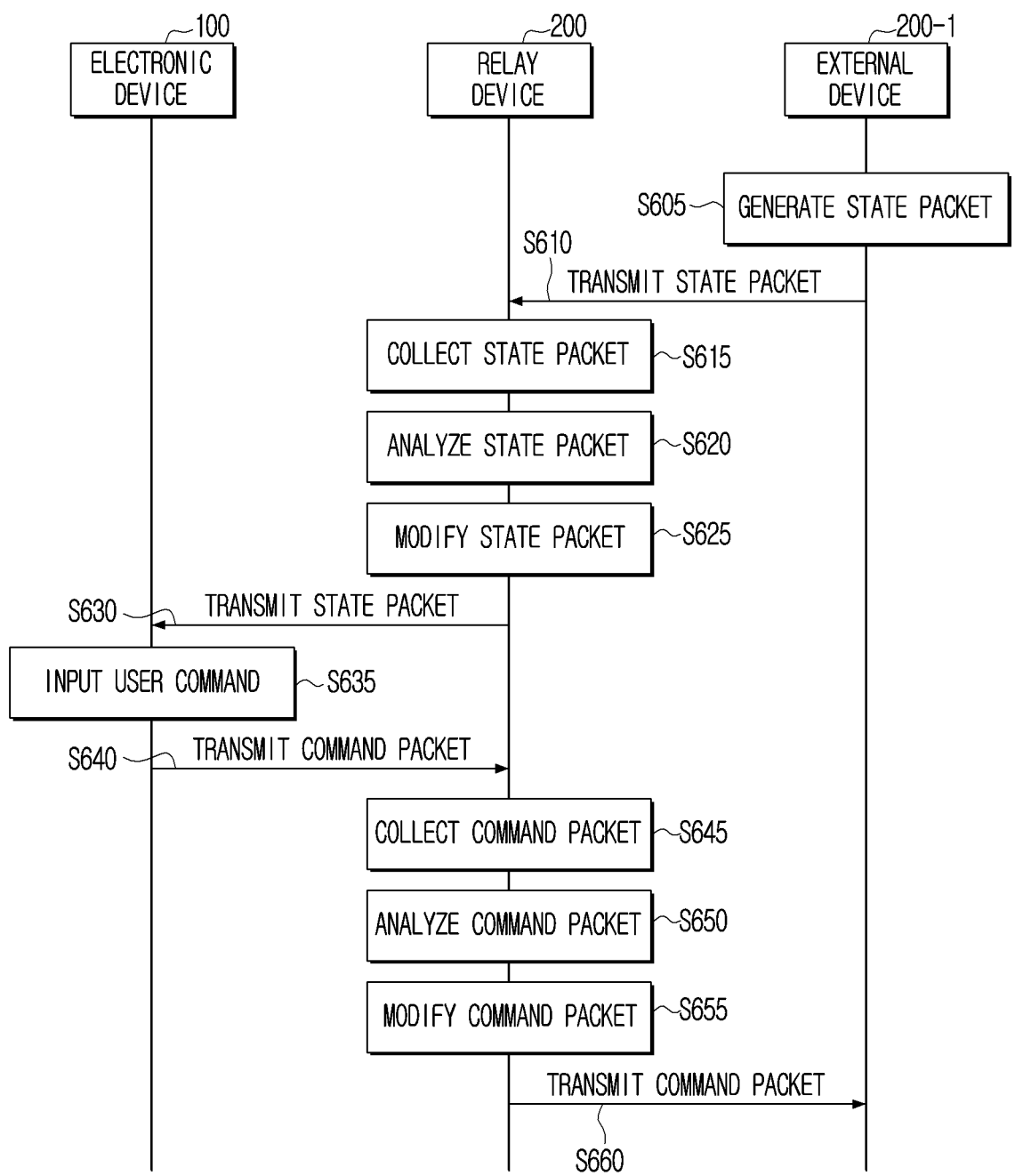

ELECTRONIC DEVICE, AND METHOD FOR CONTROLLING SAME

CROSS-REFERENCE TO RELATED APPLICATION (S)

This application is a continuation application, claiming priority under § 365(c), of an International application No. PCT/KR2020/014724, filed on Oct. 27, 2020, which is based on and claims the benefit of a Korean patent application number 10-2019-0144098, filed on Nov. 12, 2019, in the Korean Intellectual property Office, the disclosure of which is incorporated by reference herein in its entirety.

BACKGROUND

1. Field

The disclosure relates to an electronic device and a method for controlling the same. More particularly, the disclosure relates to an electronic device for performing an initial connection between devices without a distance restriction, and a method for controlling thereof.

2. Description of Related Art

With the development of computer technology, communication technology, and home electronics technology, a service in which devices in a home and a factory are connected via a network and managed emerges, and this service has been spotlighted as a future-oriented technology.

More particularly, research on Internet of things (IoT) technology which embeds a communication function in the Internet and connects to the Internet has been accelerated. A user may control various things without being affected by time and place, using a user interface (UI) provided in a mobile device, such as a smartphone.

In order to use the IoT devices, an operation of initially connecting IoT devices to a mobile device of a user is required. In the related art, in order to perform an initial connection between a mobile device of a user and an IoT device, devices for performing an initial connection should be located within a predetermined distance (e.g., 30 m). Thus, there is a need to perform an initial connection between devices without restriction of distance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for performing an initial connection between devices without a distance constraint, and a method for controlling the same.

Additional aspects will be set forth in part in the description which follows and, in part, will be apparent from the description, or may be learned by practice of the presented embodiments.

In accordance with an aspect of the disclosure, a method for controlling an electronic device is provided. The method includes obtaining a list of at least one relay device to perform initial connection with an external device and displaying the list on a display, based on a relay device being selected from the list, transmitting an access request for the selected relay device to the selected relay device, based on receiving access approval information from the relay device, displaying, on the display, a list of at least one external device capable of performing connection by the relay device. based on one external device from a list of the at least one external device being selected, receiving an authentication request for the selected at least one external device from the selected at least one external device, and based on receiving a user input in response to the authentication request, performing the initial connection with the selected at least one external device.

The selected relay device may perform communication with the selected at least one external device through a near field communication, and the list of the at least one external device may be a list about an external device capable of performing near field communication with the selected relay device.

The obtaining a list comprising at least one relay device and displaying the list on a display may include obtaining a list of the at least one relay device and a list of at least one external device capable of communicating with each of the at least one relay device.

The transmitting to the selected relay device may further include, based on one relay device being selected from the list of the at least one relay device, requesting an authentication key for the selected relay device to an external server, receiving an authentication key for the selected relay device from the external server, and based on the authentication key, transmitting an access request for the selected relay device to the selected relay device.

The receiving from the selected at least one external device may further include, based on one external device being selected from the list of the at least one external device, transmitting an initial connection request for the selected at least one external device to the relay device, and based on the initial connection request being approved from the relay device, receiving an authentication request for the selected at least one external device from the selected at least one external device.

Based on the initial connection request being transmitted to the relay device, whether the electronic device performs an initial connection with the selected at least one external device by the relay device may be identified, and based on identifying that the electronic device is to perform an initial connection with the external device, the method may include transmitting an initial connection request for the selected at least one external device from the relay device to the selected at least one external device.

Whether the electronic device is to perform connection with the selected at least one external device may be identified by at least one of whether the electronic device is pre-registered in the selected at least one external device as a connectable device or whether the selected at least one external device is a device requiring security.

The method may further include, based on the initial connection with the selected at least one external device, displaying a user interface (UI) for controlling the external device on the display, and based on a command to control the external device being input through the UI, controlling the external device to correspond to the command.

The method may further include, when communication protocols between the electronic device and the external device are different from each other, the controlling the external device may further include receiving state packet information about the connected external device from the relay device, based on a command to control the external device being input through the UI, obtaining command packet information corresponding to the command based on the received state packet information, and transmitting the obtained state packet information to the relay device.

The method may further include requesting log information about the connected external device to the relay device, and receiving log information about the connected external device from the relay device.

In accordance with another aspect of the disclosure, an electronic device is provided. The electronic device includes a communicator, a display, a memory comprising at least one instruction and at least one processor connected to the communicator, display, and memory, and configured to control the electronic device, and the at least one processor, by executing the at least one instruction, may obtain a list comprising at least one relay device to perform initial connection with an external device and control the display to display the obtained list on a display, based on a relay device being selected from the list, control the communicator to transmit an access request for the selected relay device to the selected relay device, based on receiving access approval information from the relay device, control the display to display, on the display, a list of at least one external devices capable of connection by the relay device, based on one external device among a list of the at least one external device being selected, receive an authentication request for the selected at least one external device from the selected at least one external device, and based on receiving a user input in response to the authentication request, perform an initial connection with the selected at least one external device.

Through the electronic device and a method for controlling the same, initial connection with an external device may be performed without distance restriction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in connection with the accompanying drawings, in which:

FIG. 6 is a sequence diagram illustrating a method for controlling an external device through an electronic device when a communication protocol of an electronic device and an external device is different according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
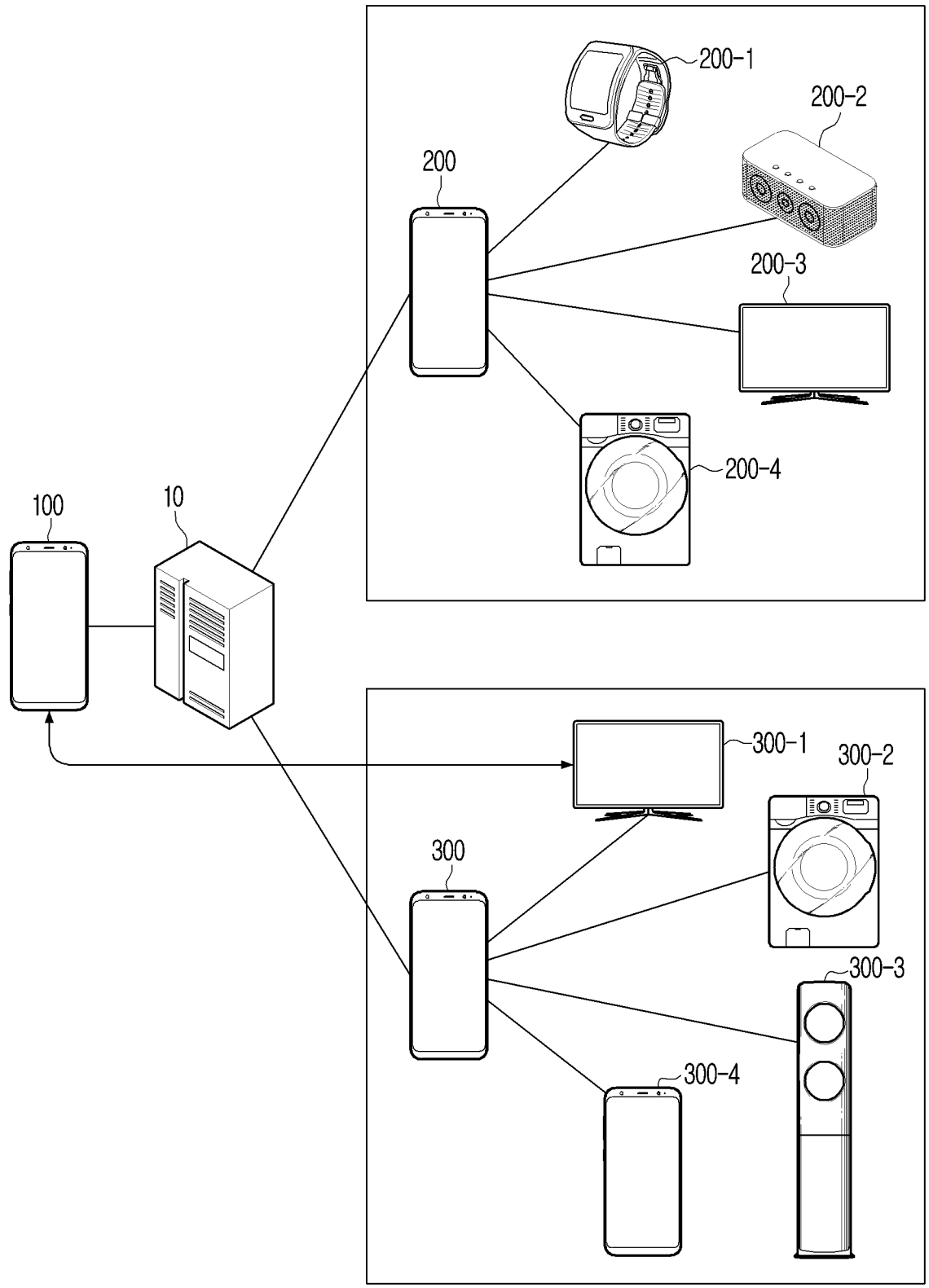
FIG. 1 is a diagram illustrating a method of performing initial connection between devices according to an embodiment of the disclosure.

FIG. 1 is a diagram illustrating a method of performing initial connection between devices according to an embodiment of the disclosure.

Referring to FIG. 1, an electronic device 100 may perform an initial connection with external devices 200-1 to 200-4 and 300-1 to 300-4 without a distance restriction through a server 10 and relay devices 200 and 300. The external devices 200-1 to 200-4 and 300-1 to 300-4 may include, for example, a smart watch 200-1, a smart speaker 200-2, a smart television (TV) 200-3, 300-1, a smart washing machine 200-4, 300-4, a smart air-conditioner 300-3, and a smartphone 300-4, or the like. The first relay device 200 of FIG. 1 is a device for relaying an initial connection between the electronic device 100 and the plurality of external devices 200-1 to 200-4 within a predetermined distance (e.g., 30 m) from the first relay device 200, and the second relay device 300 is a device for relaying an initial connection between the electronic device 100 and a plurality of external devices 300-1 to 300-4 within a predetermined distance (e.g., 30 m) from the second relay device 300. The relay devices 200 and 300 may be, for example, an electronic device, such as a smartphone, a set-top device, a tablet PC, a remote controller, a personal computer, a TV, or the like, but is not limited thereto. FIG. 1 illustrates a smartphone as an example of the relay device 200, 300. When the relay device according to the disclosure is a smartphone, the function of the relay device according to the disclosure may be performed in the form of a software application in which the function of the relay device according to the disclosure may be installed in the smartphone.

The relay devices 200 and 300 may perform near field communication (e.g., Bluetooth, Wi-Fi Direct) with the external devices 200-1 to 200-4 and 300-1 to 300-4 to relay the first connection with the external devices 200-1 to 200-4 and 300-1 to 300-4. Accordingly, a predetermined distance (e.g., 30 m) may mean a distance at which near field communication between the relay devices 200 and 300 is available.

In order to perform an initial connection with an external device, the electronic device 100 may first receive and obtain, from the server 10, a list including a plurality of relay devices for performing an initial connection with the external devices 200-1 to 200-4. The electronic device 100 may search for a relay device for initial connection and receive a list including at least one relay device corresponding to a search result from the server 10. FIG. 1 illustrates the first relay device 200 and the second relay device 300 corresponding to a search result. Although only two relay devices are illustrated in FIG. 1, the electronic device 100 may receive a list of a plurality of relay devices from the server 10 according to a search result of the relay device.

Referring to FIG. 1, the server 10 may receive a list of at least one external device capable of communicating with each relay device from the first relay device 200 and the second relay device 300. The server 10 may generate a list including the first relay device 200 and the second relay device 300, generate at least one external device list capable of communicating with each of the plurality of relay devices 200 and 300, and transmit the list to the electronic device 100.

When a list including a plurality of relay devices 200 and 300 is received from the server 10, the electronic device 100 may display the received list on the display. If the second relay device 300 is selected from the displayed list, the electronic device 100 may transmit a connection request for the second relay device 300 to the second relay device 300.

Specifically, when the second relay device 300 of the displayed list is selected, the electronic device 100 may request an authentication key for the second relay device 300 to the server 10, receive the authentication key from the server 10, and perform user authentication. According to an embodiment of the disclosure, the user authentication may be performed through authentication through a telephone number of a user, authentication through an Internet personal identification number (i-PIN) of a user, authentication through an authorization certificate of a user, or the like. However, the authentication of the user of the electronic device 100 may be performed by various authentication methods. The electronic device 100 may perform user authentication based on the received authentication key, and transmit a connection request for the second relay device 300 to the second relay device 300, which will be described later with reference to FIGS. 5A and 5B.

When the access approval information is received from the second relay device 300, the electronic device 100 may display list 300-1 to 300-4 for at least one external device capable of connecting by the second relay device 300 on the display.

If the first external device 300-1 among the lists 300-1 to 300-4 for the at least one external device is selected, the electronic device 100 may receive an authentication request for the first external device 300-1 from the first external device 300-1. Specifically, when the first external device 300-1 among the list 300-1 to 300-4 for the at least one external device is selected, the electronic device 100 may transmit an initial connection request for the first external device 300-1 to the second relay device 300, and when an initial connection request is approved from the second relay device 300, the second relay device 300 may transmit initial connection request information to the first external device 300-1.

According to an embodiment of the disclosure, the first external device 300-1 receiving initial connection request information may generate a PIN value for performing an initial connection with the electronic device 100, and convert the generated PIN value into an image. The converted image may include information on the generated PIN value, and the user may visually recognize the PIN value through the converted image. The user may visually recognize the converted image and recognize information on the PIN value included in the converted image. The details of the converted image will be described later with reference to FIGS. 4C and 4D. The first external device 300-1 may transmit the converted image (authentication request) to the electronic device 100.

In response to the initial connection request of the electronic device 100, the first external device 300-1 may transmit the converted image (authentication request) to the electronic device 100, and when a user input corresponding to the image converted into the electronic device 100 is received and the user input is matched with the authentication request, the electronic device 100 may perform an initial connection with the first external device 300-1. Specifically, when a PIN value corresponding to an image converted by a user is input, and when the inputted PIN value is matched with the PIN value generated in the first external device 300-1, the electronic device 100 may perform an initial connection with the first external device 300-1. However, the electronic device 100 may further request information about the user of the electronic device 100 (e.g., the phone number of the user of the electronic device 100, the birth date of the user of the electronic device 100) in addition to the PIN value displayed on the converted image, and the electronic device 100 may perform the initial connection with the first external device 300-1 when the information inputted by the user matches the PIN value displayed on the converted image and the information on the user.

By the various embodiments above, the electronic device 100 may perform an initial connection with an external device without distance restriction.

Figure 2:
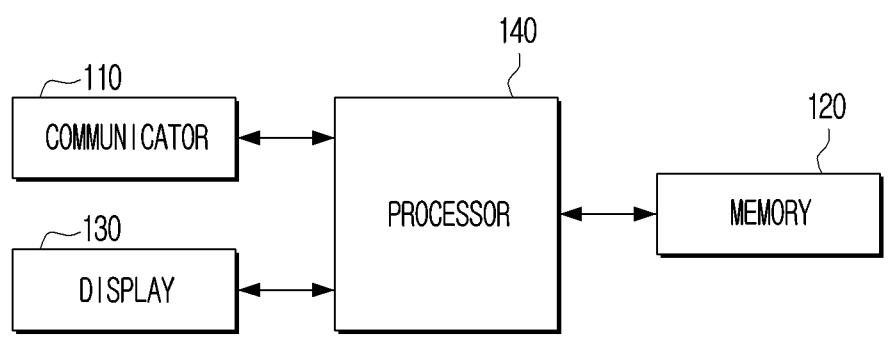
FIG. 2 is a block diagram illustrating a configuration of an electronic device 100 according to an embodiment of the disclosure.

FIG. 2 is a block diagram illustrating a configuration of an electronic device according to an embodiment of the disclosure.

Referring to FIG. 2, an electronic device 100 may include a communicator 110, a memory 120, a display 130, and a processor 140. Though not illustrated in some embodiments of the disclosure, the hardware/software configurations in the level obvious to those skilled in the art may be included in the first electronic device 100.

The electronic device 100 may be an electronic device, such as a smartphone, a tablet PC, a remote controller, a personal computer, a TV, or the like, but is not limited thereto. FIG. 2 illustrates a smartphone as an example of the electronic device 100.

The communicator 110 is configured to perform communication with various external devices and may be connected to an external device through a wireless communication, such as Wi-Fi, Bluetooth, near field communication (NFC), infrared data association (IrDA), radio frequency identification (RFID), ultra-wideband (UWB), Wi-Fi direct, Z-wave, Zigbee, internet protocol version 4 (IPv4) over low-power wireless personal area networks (4LoWPAN), general packet radio service (GPRS), weightless, digital living network alliance (DLNA), ANT+, digital enhanced cordless telecommunications (DECT), wireless local area network (WLAN), global system for mobile communications (GSM), universal mobile telecommunications system (UMTS), wireless broadband (WiBRO), or the like. The communicator 110 may communicate with an external device using wired communication method. The wired communication may include, for example, a universal serial bus (USB), Ethernet communication method, or the like. The communicator 110 may be implemented as at least one of a communication chip, a transceiver, a communication port, or the like. The electronic device 100 according to the disclosure may perform communication with a relay device and a server through the communicator 110 by using a remote distance communication method.

The memory 120 may store various data, programs or applications for driving and controlling the electronic device 100. For example, the memory 120 may store the smart control application. The program stored in the memory 120 may include one or more computer executable instructions. The program (one or more instructions) stored in the memory 120 may be executed by the processor 140.

The display 130 may be implemented as, for example, a liquid crystal display (LCD). In some cases, the display may be implemented as a cathode-ray tube (CRT), a plasma display panel (PDP), organic light emitting diodes (OLED), transparent OLED (TOLED), or the like. The display 130 may be implemented as a touch screen capable of detecting a touch manipulation of a user.

The processor 140 is a configuration for controlling the overall operation of the first electronic device 100. For example, the processor 140 may control a plurality of hardware or software components connected to the processor 140 by driving an operating system or an application program, and perform various data processing and operations. The processor 140 may be a central processing unit (CPU), a graphics-processing unit (GPU), or both. For example, the processor 140 may be implemented as at least one of a general processor, a digital signal processor, an application specific integrated circuit (ASIC), a system on chip (SoC), a microcomputer (MICOM), or the like.

The processor 140 may execute computer-executable instructions stored in the memory 120. The processor 140 may obtain a list including at least one relay device for performing an initial connection with an external device. The relay device may be a device for performing an initial connection between the electronic device 100 and an external device within a predetermined distance (e.g., 30 m) from a relay device, and may perform communication with the electronic device 100 and the external device by having a communication function. The processor 140 may receive a list including at least one relay device from the server through the communicator 110. Specifically, the server may generate a list including at least one relay device connectable to the electronic device 100, and may transmit the generated list to the electronic device 100. The processor 140 may control to display a list including at least one relay device on the display 130.

Figure 3A:
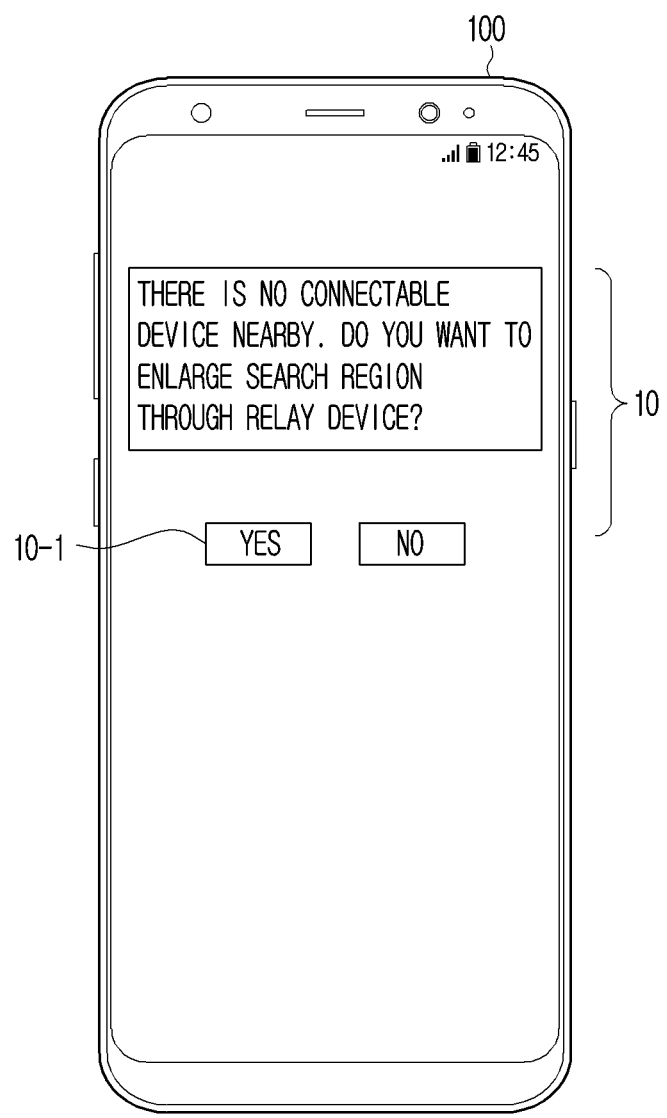
FIG. 3A is a diagram illustrating a user interface (UI) for searching a relay device, according to an embodiment of the disclosure.

FIG. 3A is a diagram illustrating a user interface UI for searching a relay device, according to an embodiment of the disclosure.

Figure 3B:
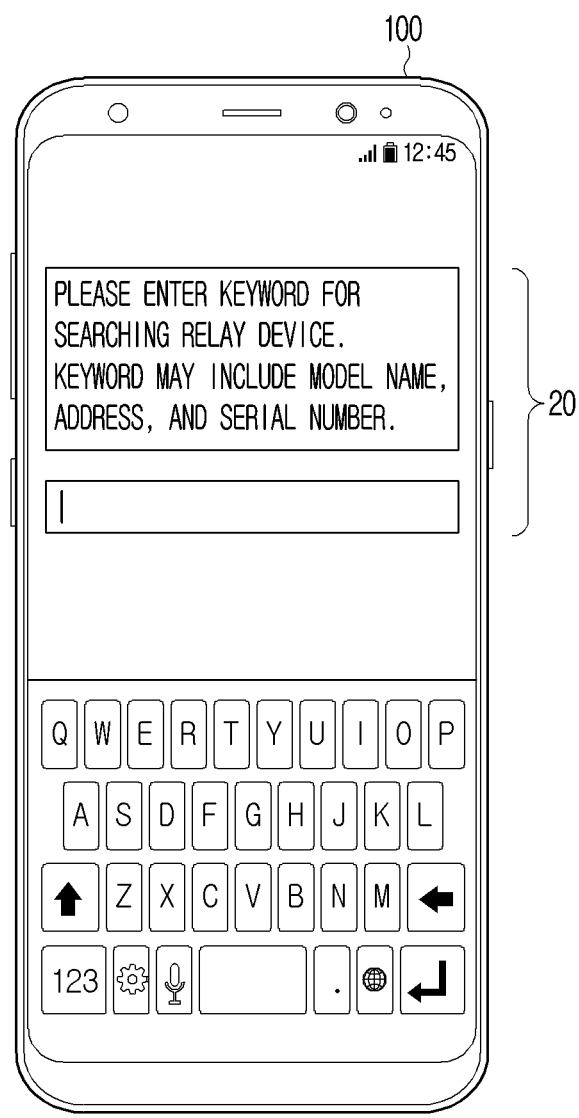
FIG. 3B is a diagram illustrating a UI for searching a relay device, according to an embodiment of the disclosure.

FIG. 3B is a diagram illustrating a UI for searching a relay device, according to an embodiment of the disclosure.

Figure 3C:
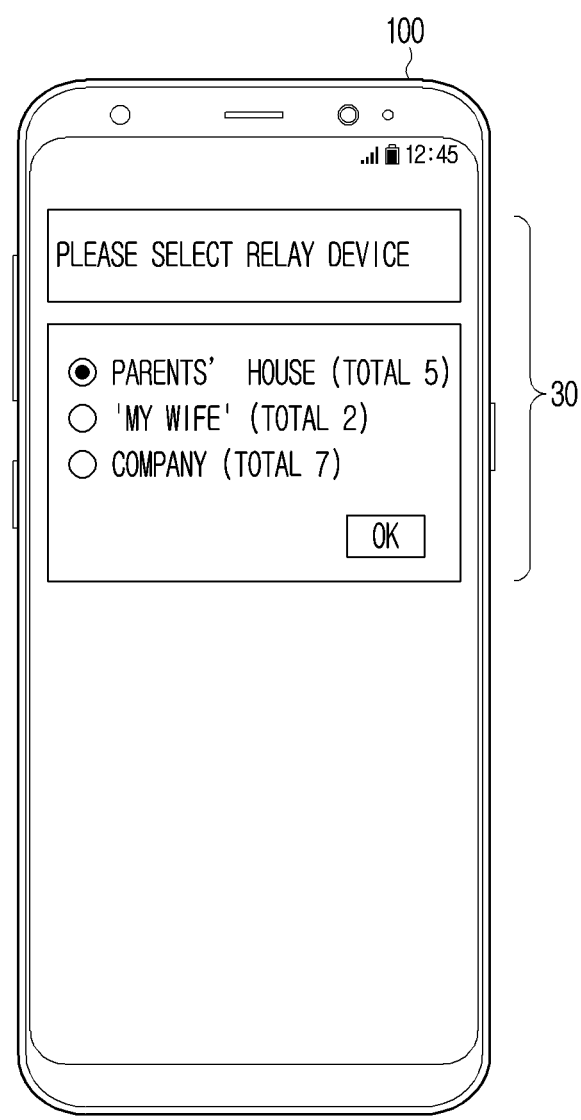
FIG. 3C is a diagram illustrating a UI for selecting a relay device according to an embodiment of the disclosure.

FIG. 3C is a diagram illustrating a UI for selecting a relay device according to an embodiment of the disclosure.

As an example of the disclosure, referring to FIG. 3A, when there is no external device for performing the initial connection in the vicinity of the electronic device 100 (e.g., within 30 m), the processor 140 may display, on the display 130, a UI 10 to confirm whether to perform the initial connection through the relay device.

Referring to FIGS. 3A, 3B, and 3C, they illustrate a UI for determining whether to perform an initial connection through a relay device when there is no external device capable of performing initial connection near the electronic device 100, but the UI may be displayed on the display 130 to determine whether to perform an initial connection through the relay device even if there is an external device that is initially connected to the electronic device 100 nearby.

Referring to the UI 10 of FIG. 3A, if a user input to perform an initial connection with an external device using the relay device is detected (select 10-1), the processor 140 may control the display 130 to display a UI 20 to search the relay device as shown in FIG. 3B. A keyword for a relay device to perform communication with an external device to perform an initial connection may be input by a user and the relay device may be found. The keyword for the relay device may include a model name, a serial number, an address or the relay device, or an address of an external device, or the like, and may include various keywords to identify the relay device.

When the keyword for the relay device is input by the user, referring to FIG. 3C, the processor 140 may display a list of searched relay devices on the display 130. The processor 140 may control to display the UI 30 for selecting a list for the searched relay device on the display 130, and transmit a connection request for the selected relay device to the selected relay device through the communicator 110 when one relay device is selected from the list through the UI 30. Referring to FIG. 3C, when a UI element for a parent's house is selected, the processor 140 may transmit a connection request to a relay device designated as the parent's house through the communicator 110.

The processor 140 may receive access approval information from the relay device selected through the communicator 110. If one relay device among a list including at least one relay device is selected, the processor 140 may request an authentication key for the selected relay device to the server. When the server receives an authentication request from the electronic device 100, the server may issue an authentication key for the selected relay device and may transmit the issued authentication key to the electronic device 100. If the authentication key is transmitted to the electronic device 100, the processor 140 may perform user authentication through the authentication key and may transmit an access request to the relay device. According to an embodiment of the disclosure, user authentication may be performed through authentication using a user's telephone number, authentication through i-PIN of a user, or authentication through an authorization certificate of a user or the like. The authentication is not limited thereto and authentication for a user of the electronic device 100 may be performed by various authentication methods.

If the access request is transmitted to the relay device by the processor 140, the relay device may identify that the user authentication is performed through the authentication key and if the user authentication is performed, the relay device may transmit the access approval information to the electronic device 100. When the electronic device 100 receives connection approval information from the relay device, the processor 140 may control the display 130 to display a list of at least one external device capable of performing a connection by a relay device that has transmitted the connection approval information to the electronic device 100. The external device included in the list for the at least one external device may be a device capable of performing communication through a near field communication method and a relay device transmitting the connection approval information to the electronic device 100. For example, the relay device that transmits the external device included in the list for the external devices and the connection approval information to the electronic device 100 may perform communication by a Bluetooth method.

Figure 4A:
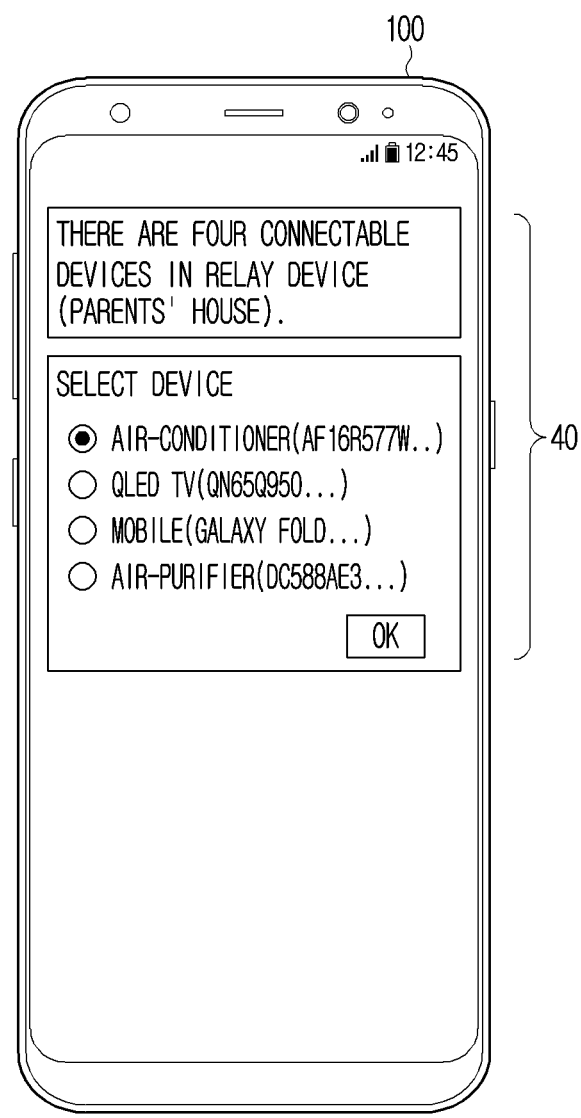
FIG. 4A illustrates a UI for selecting an external device for performing an initial connection with an electronic device, according to an embodiment of the disclosure.

FIG. 4A illustrates a UI for selecting an external device for performing an initial connection with an electronic device, according to an embodiment of the disclosure.

Figure 4B:
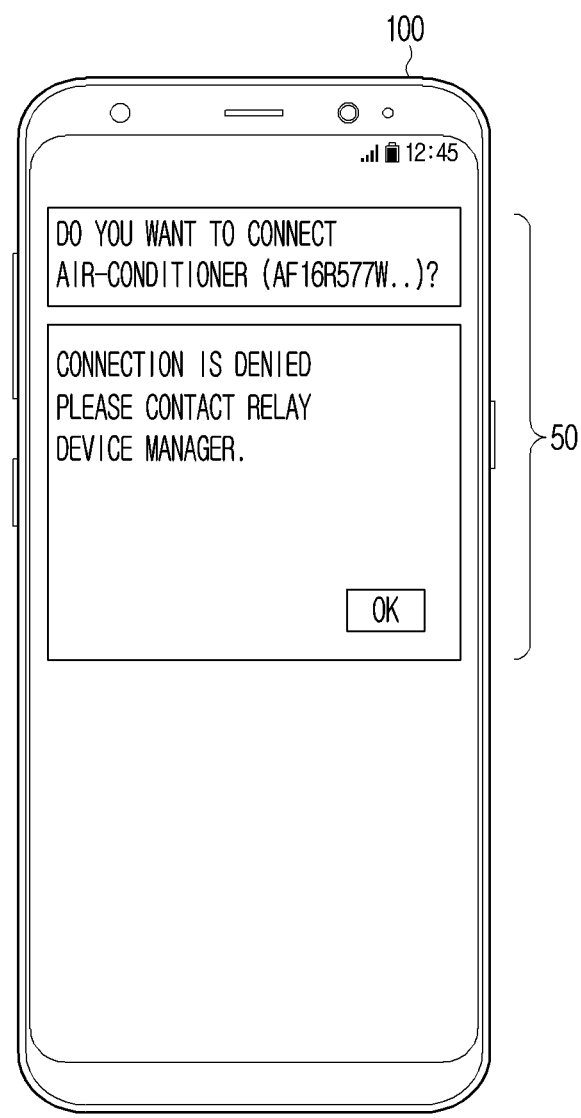
FIG. 4B is a diagram illustrating a UI indicating that an electronic device may not be connected to an external device, according to an embodiment of the disclosure.

FIG. 4B is a diagram illustrating a UI indicating that an electronic device may not be connected to an external device, according to an embodiment of the disclosure.

Figure 4C:
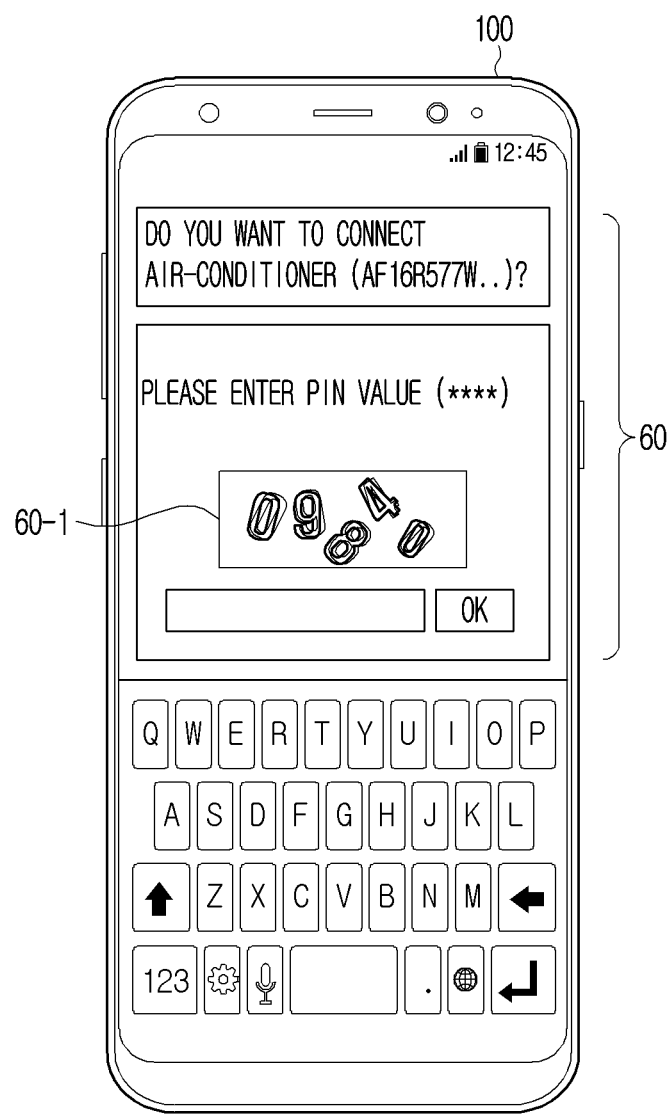
FIG. 4C is a diagram illustrating a UI for inputting a personal identification number (PIN) value for initial connection with an external device, according to an embodiment of the disclosure.

FIG. 4C is a diagram illustrating a UI for inputting a PIN value for initial connection with an external device, according to an embodiment of the disclosure.

Figure 4D:
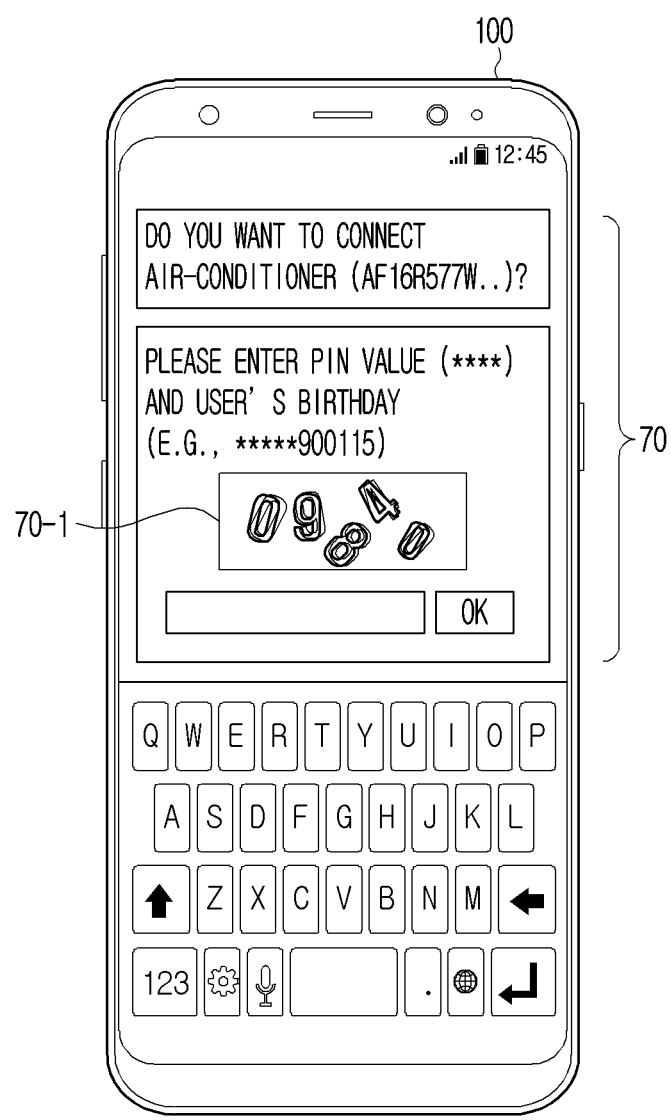
FIG. 4D is a diagram illustrating a UI for inputting a PIN value and user information for initial connection with an external device, according to an embodiment of the disclosure.

FIG. 4D is a diagram illustrating a UI for inputting a PIN value and user information for initial connection with an external device, according to an embodiment of the disclosure.

Referring to FIG. 4A, according to an embodiment of the disclosure, the processor 140 may control the display 130 to display, on the display 130, a UI 40 including a list of at least one external device capable of performing initial connection by the relay device designated as the parent's house. The air-conditioner, quantum dot LED (QLED) TV, mobile, and air cleaner displayed on the UI 40 may be external devices capable of performing initial connection with the electronic device 100 by the relay device designated as the parent's house.

If one external device of the list for the at least one external device is selected, the processor 140 may receive an authentication request for the selected external device from the selected external device through the communicator 110. If one external device of the list for at least one external device is selected, the processor 140 may transmit an initial authentication request for the selected external device to the relay device.

The relay device may identify whether to perform an initial connection between the electronic device 100 and the selected external device. The relay device may identify whether the electronic device 100 is pre-registered as a device connectable to the selected external device. In an embodiment of the disclosure, the relay device may identify whether the electronic device 100 is included in a white list and whether the electronic device 100 is not included in a black list, and may identify whether the electronic device 100 is pre-registered as a device connectable to the selected external device. By identifying whether the selected external device is a device requiring security, whether to perform initial connection between the electronic device 100 and the selected external device may be identified. A specific detail of a method of identifying whether the relay device performs an initial connection with the electronic device 100 and the selected external device will be described with reference to FIGS. 5A and 5B.

Referring to FIG. 4B, if the electronic device 100 is identified to be unable to perform the initial connection with the selected external device by the relay device, the processor 140 may control the display 130 to display a UI 50, on the display 130, indicating that the selected external device may not perform the initial connection.

If the electronic device 100 is identified as being able to perform the initial connection with the selected external device by the relay device, the relay device may transmit an initial authentication request for the selected external device to the selected external device. The processor 140 may receive an authentication request for the selected external device from the selected external device through the communicator 110.

According to an embodiment of the disclosure, the authentication request for the selected external device may be received at the electronic device 100 in an image form that includes information on the PIN value. Specifically, in order to perform authentication with the selected external device, the external device may generate a PIN value, transform the PIN value into an image form, and generate an image including information on the PIN value.

When the PIN value is transformed into an image form, the security for the PIN value may be enhanced. When the generated PIN value is transmitted to the electronic device 100 as the data form, there may be a risk of hacking data on the PIN value. In contrast, when the PIN value is transformed and transmitted in the form of an image, it is possible to identify information on the PIN value only when the PIN value should be visually recognized, and thus the security may be enhanced when the PIN value is transmitted in the form of data.

Referring to FIGS. 4C and 4D, when it is identified that the electronic device 100 may perform initial connection with the selected external device by the relay device, the electronic device 100 may receive an image 60-1 including a PIN value from an external device. The processor 140 may control the display 130 to display a UI 60 for performing authentication on the display 130. The UI 60 may include an image 60-1 including a PIN value received from the selected external device. When a PIN value ('09840' in FIG. 4C) corresponding to the image 60-1 including the PIN value is input by the user, the processor 140 may perform an initial connection with the selected external device.

However, it is not limited to FIG. 4C, and a UI 70 for inputting information (e.g., date of birth, back number of a phone number, or the like) about the user of the electronic device 100 is displayed, along with the PIN value corresponding to an image 70-1 including the PIN value as FIG. 4D, and if the PIN value and the user information match, the electronic device 100 may perform the initial connection with the selected external device.

When the electronic device 100 and the processor 140 are initially connected, the processor 140 may directly control an external device without the relay device. Based on the initial connection of the electronic device 100 with the selected external device, the processor 140 may control the display 130 to display a user interface (UI) for controlling the external device on the display 130. Based on a command to control the external device being input through the UI, the processor 140 may control the external device to correspond to the command.

According to an embodiment of the disclosure, even when the communication protocols of the electronic device 100 and the external device are different from each other, the electronic device 100 may control the external device through the relay device. For example, if an external device is an air purifier made by a company A, and the air purifier may communicate only through a communication protocol corresponding to company A, through the relay device according to the disclosure, the electronic device 100 may control the air purifier.

When communication protocols between the electronic device 100 and the external device are different from each other, the processor 140 may receive state packet information about the connected external device from the relay device through the communicator 110. Based on a command to control the external device being input through the UI, the processor 140 may obtain command packet information corresponding to the command based on the received state packet information, and transmit the obtained state packet information to the relay device, thereby controlling the external device. When the communication protocol between the electronic device 100 and the external device is different, the electronic device 100 may control the external device through the relay device, and a specific method for controlling the external device will be described later with reference to FIG. 6.

According to an embodiment of the disclosure, the electronic device 100 may receive log information about the connected external device from the relay device. The processor 140 may request log information about the connected external device to the relay device. The relay device may generate requested log information about the external device. The processor 140 may receive log information about an external device connected from the relay device through the communicator 110. A method of obtaining log information for an external device will be described later with reference to FIG. 7.

According to various embodiments as described above, the electronic device 100 may perform an initial connection with an external device without limiting the distance. According to various embodiments as described above, in performing an initial connection with an external device by the electronic device 100, security may be enhanced.

Figure 5A:
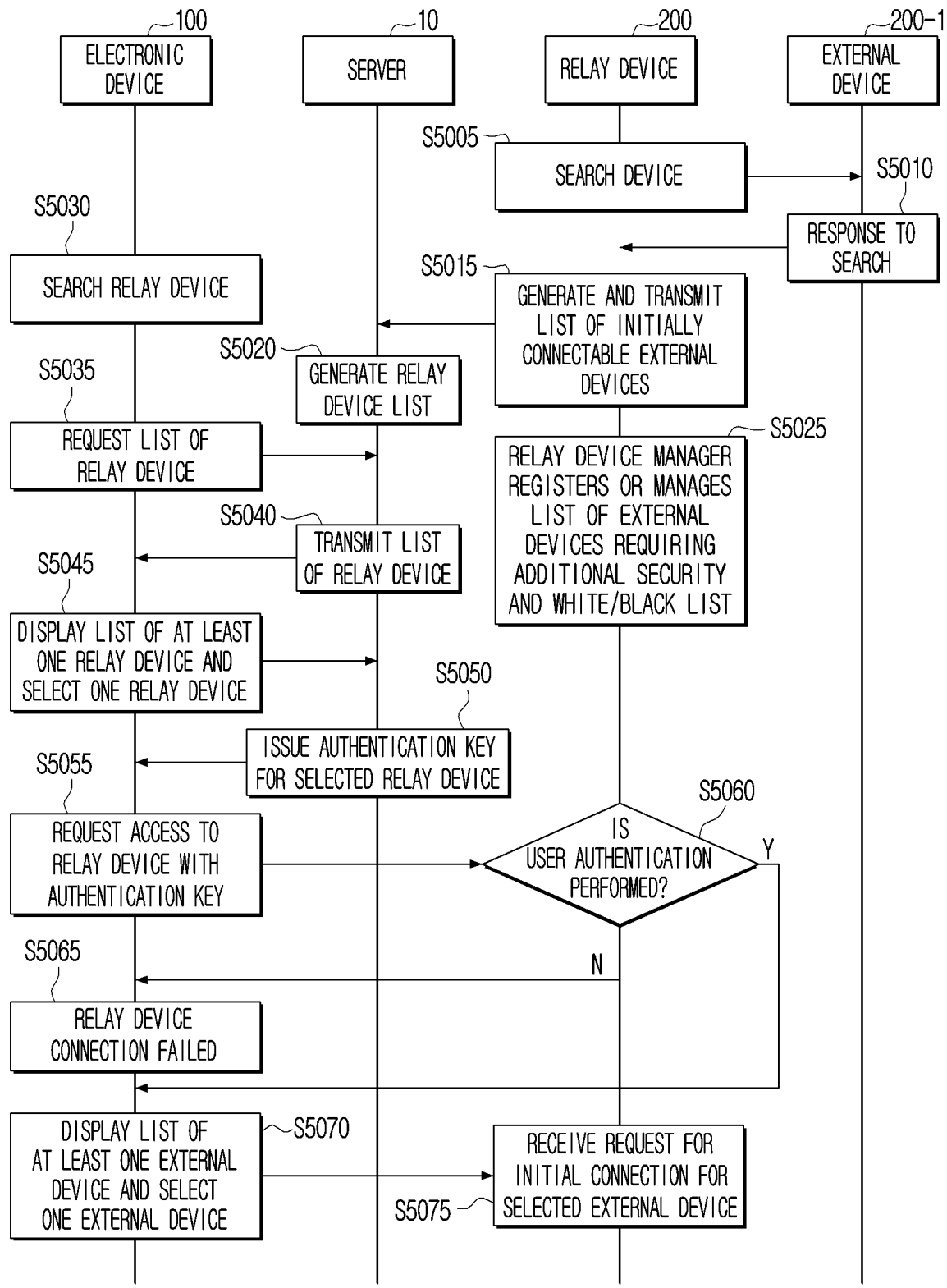
FIG. 5A is a sequence diagram illustrating a method of performing an initial connection between an electronic device and an external device, according to an embodiment of the disclosure.
Figure 5B:
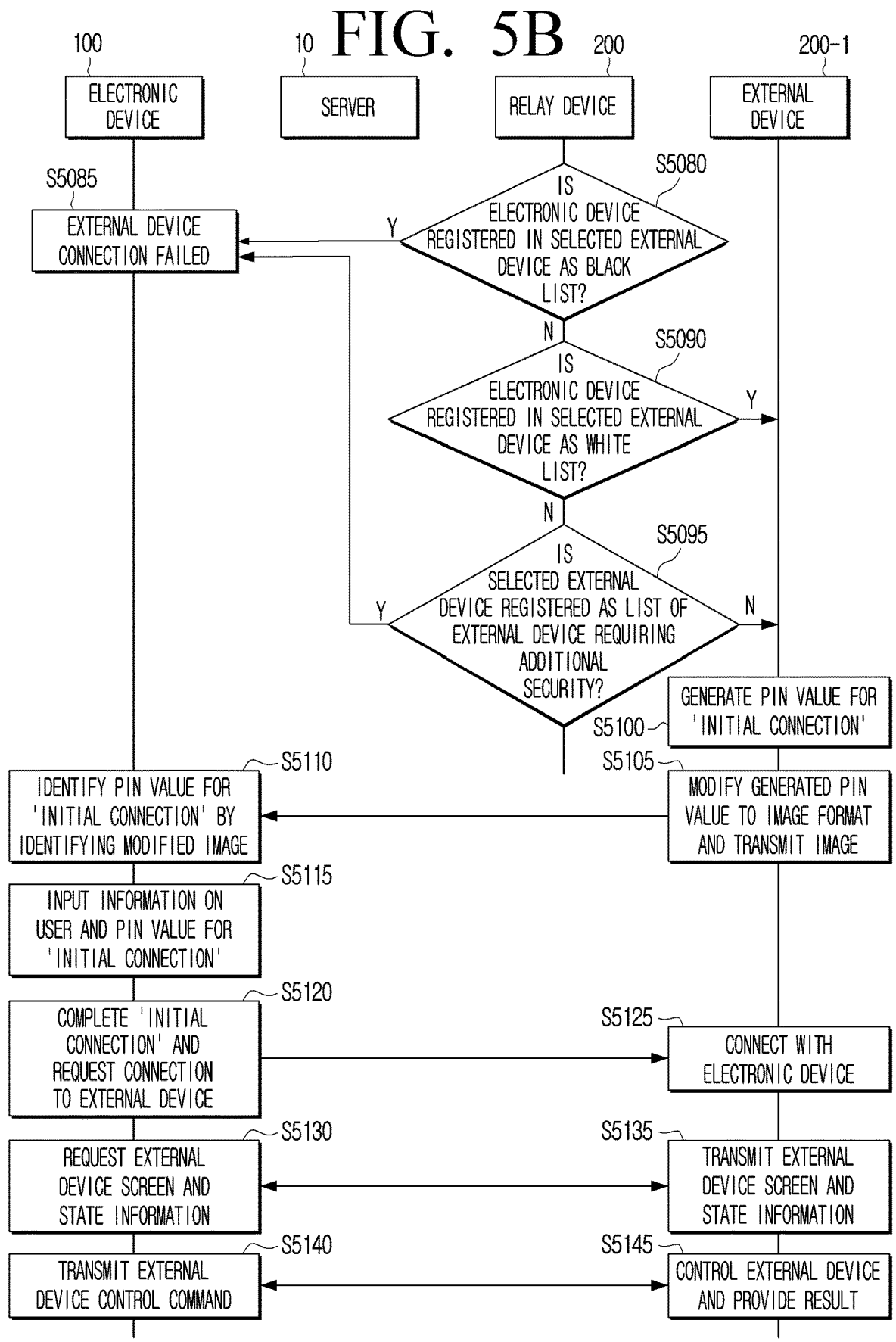
FIG. 5B is a sequence diagram illustrating a method of performing an initial connection between an electronic device and an external device, according to an embodiment of the disclosure.

FIGS. 5A and 5B are sequence diagrams illustrating a method of performing an initial connection between an electronic device and an external device, according to various embodiments of the disclosure.

Referring to FIG. 5A, the relay device 200 may search for a communicable external device 200-1 device in operation S5005, and the external device 200-1 communicable with the relay device 200 may respond to the search in operation S5010. The relay device 200 may generate a list of external devices that may be initially connected to the electronic device 100 and transmit the list to the server 10 in operation S5015. Referring to FIGS. 5A and 5B, one external device 200-1 capable of communicating with the relay device 200 is illustrated, but the embodiment is not limited thereto, and the relay device 200 may receive a search response from a plurality of external devices capable of performing near field communication with the relay device 200, and may generate a list of a plurality of external devices.

The relay device 200 may register or manage a white list and a black list through a relay device manager, and may register or manage a list of external devices requiring additional security in operation S5025. The relay device 200 may identify whether to approve the access request from the electronic device through a white list and a black list. When the external device 200-1 is registered as an external device requiring additional security, the relay device 200 may reject a request to access the external device 200-1 from the electronic device. When the external device 200-1 is an external device that may cause privacy infringement, such as a closed circuit television (CCTV) or a camera, the user may register the external device 200-1 as a device requiring additional security through the relay device manager.

When the server 10 receives the list of external devices that may be initially connected by the relay device 200 from the relay device 200, the server may collect the relay device list and generate a relay device list in operation 55020. Referring to FIGS. 5A and 5B, one relay device 200 is shown to transmit an external device list to the server 10, but the embodiment is not limited thereto, and the server 10 may receive a list of external devices initially connectable by each of the relay device from the at least one relay device, and may generate a list of the at least one relay device.

The electronic device 100 may search the relay device in operation S5030 and may request a list of relay device to the server 10 in operation S5035. As illustrated in FIG. 3B, by inputting a keyword for the relay device, the relay device 200 for initial connection with the external device 200-1 may be searched. The server 10 may transmit the relay device list to the electronic device 100 based on the search result in operation S5040.

When the electronic device 100 receives the relay device list from the server 10, the electronic device 100 may display the relay device list on the display. When one relay device is selected from the displayed relay device list, the access request for the selected relay device may be transmitted to the server 10 in operation S5045. The server 10 may issue an authentication key for the selected relay device in operation S5050 and may transmit the authorization key to the electronic device 100.

The electronic device 100 may perform user authentication by receiving an authentication key from the server 10. According to an embodiment of the disclosure, the user authentication may be performed through authentication by a user's telephone number, authentication by i-PIN of a user, or authentication by authentication certificate of a user, or the like. The embodiment is not limited thereto and authentication for the user of the electronic device 100 may be performed by various authentication methods.

The electronic device 100 may transmit a connection request to the relay device with an authentication key in operation S5055. When the relay device 200 receives a connection request from the electronic device 100, the relay device 200 may identify whether user authentication is performed through the authentication key corresponding to the connection request in operation S5060. If the user authentication is identified as not being performed in operation S5060-N, the relay device 200 may reject the connection request received from the electronic device 100 in operation S5065.

If it is identified that the user authentication has been performed in operation S5060-Y, the electronic device 100 may display at least one external device list capable of communicating with the relay device 200, and one external device of the list may be selected by the user in operation S5070. The electronic device 100 may transmit an initial connection request for the selected external device to the relay device 200. The following description will be described later with reference to FIG. 5B.

Referring to FIG. 5B, when the relay device 200 receives an initial connection request in operation S5075, the relay device 200 may identify whether the electronic device 100 is registered as a black list in the selected external device 200-1 in operation S5080. If the electronic device 100 is registered as a black list in operation S5080-Y, the relay device 200 may reject the initial connection request of the electronic device 100, and the electronic device 100 may fail the initial connection with the external device in operation S5085.

If the electronic device 100 is not registered as a black list in operation S5080-N, the relay device 200 may identify whether the electronic device 100 is registered as a white list in the selected external device in operation S5090. When the electronic device 100 is registered as a white list in operation S5090-Y, the relay device 200 may transmit an initial connection request to the external device 200-1, and the external device 200-1 may generate a PIN value for initial connection in operation S5100.

If the electronic device 100 is not registered as a white list in operation S5090-N, the relay device 200 may identify whether the selected external device is registered as an external device list requiring additional security in operation S5095. If the selected external device is registered with an external device list requiring additional security in operation S5095-Y, the relay device 200 may reject the initial connection request of the electronic device 100 to cause the electronic device 100 to fail the initial connection with the external device in operation S5085. If the selected external device is not registered as an external device list requiring additional security in operation S5095-N, the relay device 200 may transmit an initial authentication request to the external device 200-1, and the external device 200-1 may generate a PIN value for initial connection in operation S5100.

If the PIN value for initial connection is generated by the external device 200-1, the external device 200-1 may modify the generated PIN value to an image format and transmit to the electronic device 100 in operation S5105.

When the electronic device 100 receives the modified image, the electronic device 100 may determine the modified image and determine the PIN value for initial connection in operation S5110. The electronic device 100 may receive a PIN value for initial connection and information about the user in operation S5115. The information about the user may be, for example, a phone number of a user and information about the user's birth date. If the received PIN value and the information on the user match the PIN value displayed on the converted image and the information on the user, the electronic device 100 may complete the initial connection with the external device 200-1 and may request a connection to the external device in operation S5120. The external device 200-1 may receive a connection request and perform a connection with the electronic device 100 in operation S5125.

When the first connection between the electronic device 100 and the external device 200-1 is completed, if the electronic device 100 requests the external device screen and state information to the external device 200-1 in operation S5130, the external device 200-1 may transmit the external device screen and state information to the electronic device 100 in operation S5135. If the electronic device 100 transmits a command for controlling the external device 200-1 to the external device 200-1 in operation S5140, the external device 200-1 may be controlled according to the received command, and the external device 200 may transmit the control result to the electronic device 100 in operation S5145.

By various embodiments as described above, the electronic device may perform an initial connection with an external device without a distance restriction. According to the various embodiments described above, security may be enhanced in performing the initial connection between the electronic device and the external device.

FIG. 6 is a sequence diagram illustrating a method for controlling an external device through an electronic device when a communication protocol of an electronic device and an external device is different according to an embodiment of the disclosure.

The electronic device 100 and the external device 200-1 may use different communication protocol methods, and the relay device 200 according to the disclosure may perform a bridge role between devices using different communication protocol methods.

Referring to FIG. 6, in a state when the initial connection between the electronic device 100 and the external device 200-1 is completed, the external device 200-1 may generate a state packet in operation S605, and may transmit the generated state packet to the relay device 200 in operation S610. The packet is a data transmission unit divided so as to be easily transmitted through network and the state packet of the disclosure may include data, or the like, for communication protocol types of the external device 200-1.

In operation S615, the relay device 200 may collect state packets for the external device 200-1 in operation S615, and analyze the collected state packet in operation S620. According to an embodiment of the disclosure, a state packet collected using an artificial intelligence model for converting a state packet to another protocol language may be analyzed. The relay device 200 may convert the analyzed collected state packet to correspond to a communication protocol suitable for the electronic device 100 in operation S625.

In operation S630, the relay device 200 may transmit the converted state packet to the electronic device 100. If the electronic device 100 receives the converted state packet and the external device 200-1, and the control command of the user is input in operation S635, the electronic device 100 may generate a command packet corresponding to the received command based on the received state packet and transmit the command packet to the relay device 200 in operation S640.

When the relay device 200 receives the command packet from the electronic device 100, the relay device 200 may collect the received command packet in operation S645 and analyze the collected command packet in operation S650. According to an embodiment of the disclosure, a command packet collected using an artificial intelligence model for converting a command packet into another protocol language may be analyzed. The relay device 200 may convert the analyzed command packet into a communication protocol corresponding to the external device 200-1 in operation S655.

The external device 200-1 may be controlled by the electronic device 100 as the relay device 200 transmits the converted command packet to the external device 200-1 in operation S660.

Through the above process, even if the electronic device 100 and the external device 200-1 use different communication protocol methods, the electronic device 100 may control the external device 200-1 through the relay device 200.

Figure 7:
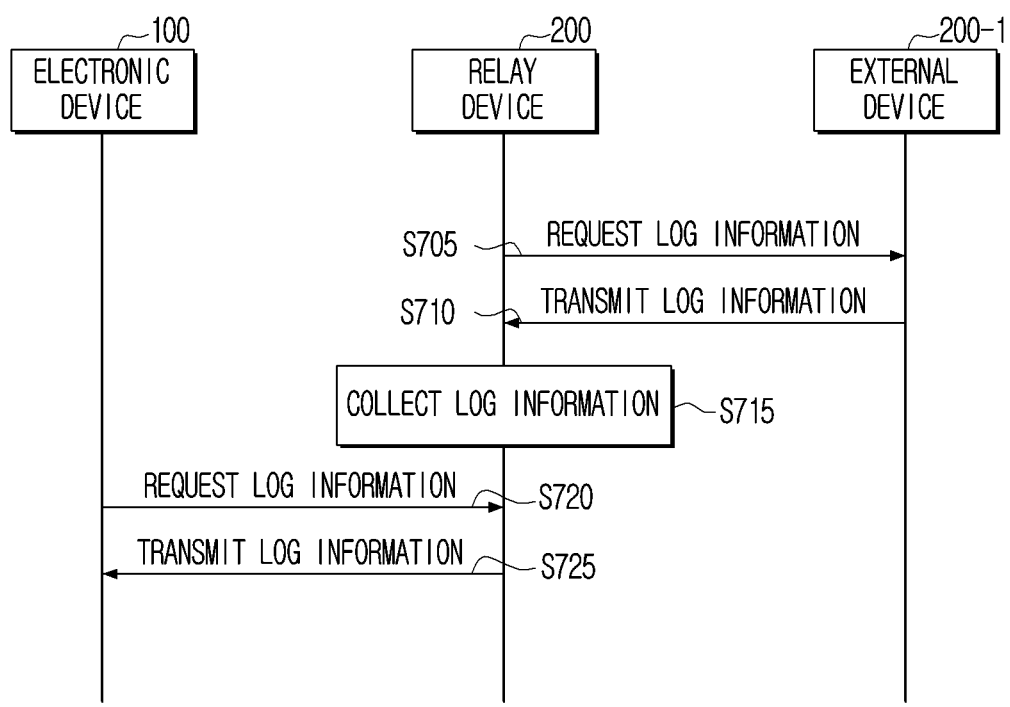
FIG. 7 is a sequence diagram illustrating a method for obtaining log information for an external device through a relay device according to an embodiment of the disclosure.

FIG. 7 is a sequence diagram illustrating a method for obtaining log information for an external device through a relay device according to an embodiment of the disclosure.

Referring to FIG. 7, when a repair for the external device 200-1 is required, even though an engineer of the after service (AS) center does not visit the place where the external device 200-1 is located, the electronic device 100 located at the AS center may control the external device 200-1 through the relay device according to the disclosure, and may address the issue of the external device 200-1. In this example, the engineer of the AS center may collect the log information of the external device 200-1 and need to understand the problem of the external device 200-1. The log information is recorded according to the flow of time or processing content of the electronic device, and when the electronic device has failed, the log information may be used for the restoration of data or the investigation of a cause of the failure.

The electronic device 100 may obtain log information of the external device 200-1 through the relay device 200 according to the disclosure. Specifically, referring to FIG. 7, when the initial connection of the electronic device 100 and the external device 200-1 is completed, the relay device 200 may request log information to the external device 200-1 in operation S705. The external device 200-1 may transmit the log information to the relay device 200 by the request of the relay device 200 in operation S710.

The relay device 200 may collect log information on the external device 200-1 in operation S715, store the information, and when there is a log information request for the external device 200-1 of the electronic device 100 in operation S720, the log information may be transmitted to the electronic device 100 in operation S725.

Through the aforementioned process, the electronic device 100 may obtain the log information of the external device 200-1 without distance restriction through the relay device 200.

Figure 8:
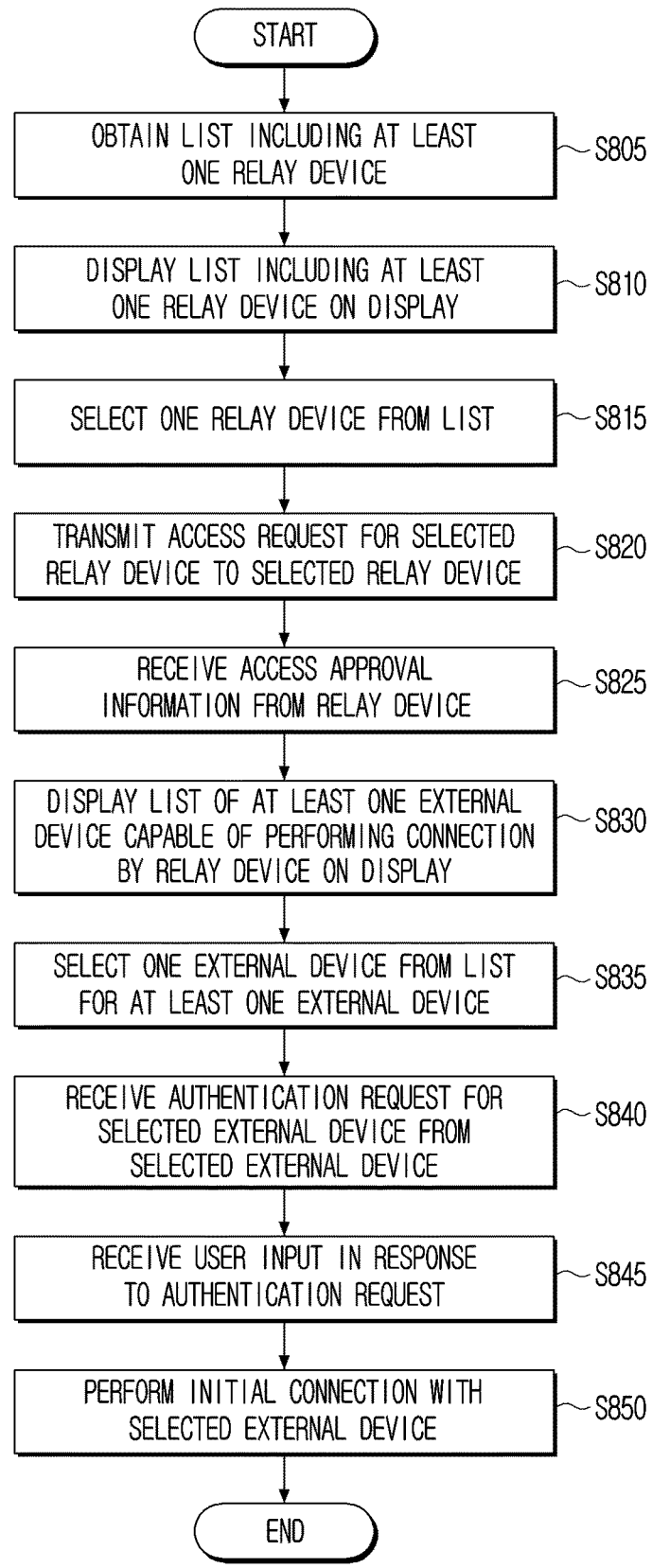
FIG. 8 is a flowchart illustrating a method of controlling an electronic device according to an embodiment of the disclosure.

FIG. 8 is a flowchart illustrating a method of controlling an electronic device according to an embodiment of the disclosure.

Referring to FIG. 8, the electronic device 100 may obtain a list including at least one relay device in operation S805. For example, the electronic device 100 may search the relay device for initial connection, and may receive, from a server, a list including at least one relay device corresponding to the searched result.

The electronic device 100 may display the obtained list including at least one relay device on the display in operation S810.

Based on a relay device being selected from the displayed list in operation 815, the electronic device 100 may transmit an access request for the selected relay device to the selected relay device in operation S820. Based on a relay device being selected from the displayed list, an authentication key for the selected relay device may be received from the external server, and based on the authentication key, an access request for the selected relay device may be transmitted to the selected relay device.

If the access approval information is received from the relay device in operation S825, the electronic device 100 may display a list of at least one external device capable of performing the connection by the relay device on the display in operation S830. A list of at least one external device may be received from a server, and in an embodiment of the disclosure, a list of at least one external device may be received from the server along with a list including at least one relay device.

If one external device from the list for the at least one external device is selected in operation S835, the electronic device 100 may receive an authentication request for the selected external device from the selected external device in operation S840. According to an embodiment of the disclosure, when one external device is selected, the electronic device 100 may transmit an initial connection request for the selected external device to the relay device. The relay device may identify whether the electronic device 100 performs an initial connection with the selected external device. According to an embodiment of the disclosure, by at least one of whether the electronic device is previously registered as a device connectable to the selected external device and whether the selected external device is a device requiring security, whether the electronic device 100 performs an initial connection with the selected external device may be identified. If the electronic device is identified to perform the initial connection with the external device, the first connection request may be identified as being approved, and the relay device may transmit an initial connection request to the selected external device, and the electronic device 100 may receive an authentication request for the selected external device from the selected external device.

The electronic device may receive the user input in response to the received authentication request in operation S845. According to an embodiment of the disclosure, the electronic device 100 may receive the authentication request in the form of data in which the PIN value generated by the external device is modified in the form of an image. The electronic device 100 may receive the data in which the PIN value is modified into an image format, and the user of the electronic device 100 may visually recognize the modified image, and the electronic device 100 may receive a user input corresponding to the PIN value.

If the user's input corresponds to the authentication request received from the external device, the electronic device 100 may perform the initial connection with the selected external device in operation S850. When the electronic device 100 and the external device are initially connected, the electronic device 100 can directly control the external device without a relay device.

Figure 9:
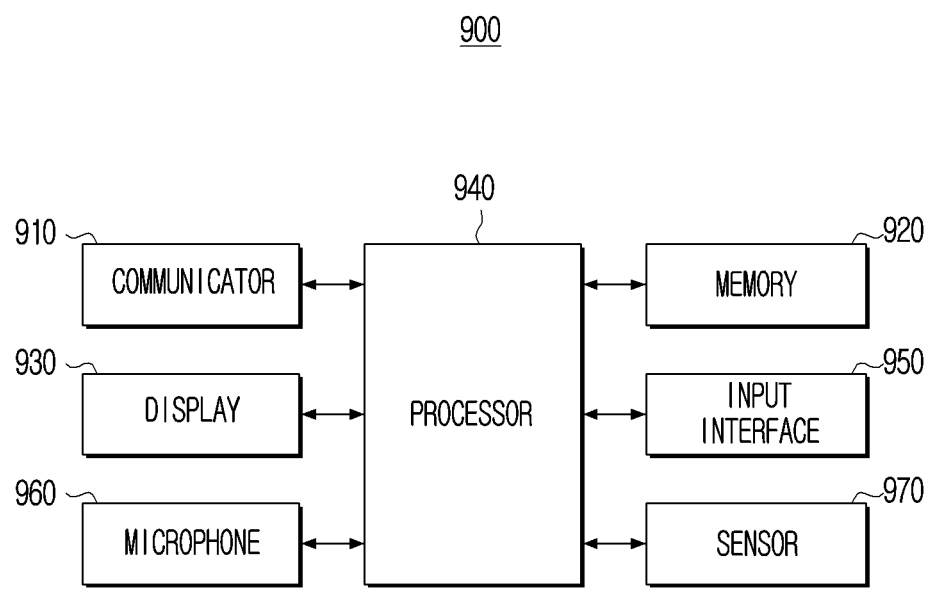
FIG. 9 is a block diagram of an electronic device according to an embodiment of the disclosure.

FIG. 9 is a block diagram of an electronic device according to an embodiment of the disclosure.

Referring to FIG. 9, an electronic device 900 may include a communicator 910, a memory 920, a display 930, a processor 940, an input interface 950, a microphone 960, and a sensor 970. Some configurations of the communicator 910, the memory 920, the display 930, and the processor 940 are the same as the configurations of FIG. 2 and a duplicate description will be omitted.

The input interface 950 may receive a user command. In an embodiment of the disclosure, the input interface 950 may include at least one of a physical button for receiving a user command, a voice recognition sensor, and an infrared sensor, and may be implemented in the form of a touch screen for detecting a user touch operation. The input interface 950 includes a physical button, and the user may enter a user command by pressing a physical button. The input interface 950 includes a touch screen, and a user may input a user command by touching the touch screen. The input interface 950 includes a voice recognition sensor, and the user may input a user command by utterance of the user voice to the microphone 960. The input interface 950 may include an infrared sensor, and the user may enter a user command by accessing a predetermined distance from the electronic device 900. The predetermined distance may be set to a default and may be set by the user. For example, the input interface 950 may include a physical button, a voice recognition sensor, and an infrared sensor, but the input interface 950 may include various configurations capable of receiving a command of a user by interacting with a user.

The microphone 960 receives an audio signal from the outside. The audio signal may include a user voice, and the user voice may include a voice for selecting one relay device or an external device in a list including at least one relay device or an external device, and may include a user input corresponding to an authentication request received from an external device. The external device may also include instructions for controlling the external device. The electronic device 900 disclosed in FIG. 9 is disclosed as including the microphone 960, but is not limited thereto, and an external electronic device may receive an audio signal, and the electronic device according to the disclosure may receive an audio signal from an external electronic device.

The sensor 970 may detect the position of the electronic device 900. Specifically, the sensor 970 may include a global positioning system (GPS) sensor, and may receive a GPS signal from an artificial satellite through a GPS sensor to detect the position of the electronic device 900. However, the embodiment is not limited thereto and may include a sensor to use a global navigation satellite system (GNSS), such as GLONASS, GALILEO, BeiDou, or the like.

However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements throughout the disclosure.

In the disclosure, expressions, such as "have," "may have," "include," "may include" or the like represent presence of a corresponding feature (for example, components, such as numbers, functions, operations, or parts) and does not exclude the presence of additional feature.

In this document, the expressions "A or B," "at least one of A and/or B," or "one or more of A and/or B," or the like, include all possible combinations of the listed items. For example, "A or B," "at least one of A and B," or "at least one of A or B" includes (1) at least one A, (2) at least one B, or (3) at least one A and at least one B together.

As used herein, the terms "first," "second," or the like may denote various components, regardless of order and/or importance, and may be used to distinguish one component from another, and does not limit the components. For example, a first user device and a second user device may indicate different user devices regardless of a sequence or importance thereof. For example, the first component may be named the second component and the second component may also be similarly named the first component, without departing from the scope of the disclosure.

The terms, such as "module," "unit," "part", and so on are used to refer to an element that performs at least one function or operation, and such element may be implemented as hardware or software, or a combination of hardware and software. Further, except for when each of a plurality of "modules", "units", "parts", or the like, needs to be realized in an individual hardware, the components may be integrated in at least one module or chip and be realized in at least one processor.

Terms used in the disclosure may be used only to describe specific embodiments rather than restricting the scope of other embodiments. Terms used in the specification including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even though they are defined in the disclosure.

The electronic devices according to various embodiments may include at least one of, for example, smartphones, tablet personal computer (PC)s, mobile phones, video telephones, artificial intelligence (AI) speaker, electronic book readers, desktop PCs, laptop PCs, netbook computers, workstations, servers, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device.

In an embodiment of the disclosure, the electronic device may include at least one of a furniture, a portion of a building/structure, an electronic board, an electronic signature receiving device, a projector, or various metrology instruments (e.g., water, electricity, gas, or radio wave measuring equipment, or the like). The electronic device according to various embodiments may be one or a combination of the aforementioned various devices. The electronic device according to an embodiment may be a flexible electronic device. The electronic device according to an embodiment may include an electronic device that is connected to the external Internet through connection with a network equipment, such as an access point, a gateway, a router, a switch, or the like, and may include a new electronic device in accordance with the technology development.

A first electronic device 100 is a device capable of performing registration, control, management, or the like, for another electronic device. In some cases, the first electronic device 100 may be referred to as a control device, and the other electronic device may be referred to as a controlled device.

The various embodiments described above may be implemented in software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor 140 of the first electronic device 100. According to a software implementation, embodiments of the disclosure, such as the procedures and functions described herein may be implemented with separate software modules. Each of the above-described software modules may perform one or more of the functions and operations described herein.

The various example embodiments as described above may be implemented with software including instructions stored in the machine-readable storage media readable by a machine (e.g., a computer). A machine is a device which may call instructions from the storage medium and operate according to the called instructions, and may include the first electronic device 100 of the embodiments.

When an instruction is executed by a processor, the processor may perform functions corresponding to the instruction, either directly or under the control of the processor, using other components. The instructions may include a code generated by a compiler or executed by an interpreter. For example, the instructions stored in the storage medium may be executed by the processor and the aforementioned controlling method of the electronic device may be executed. For example, by executing the at least one instruction stored in a storage medium by a processor of a device (or an electronic device), obtaining a list comprising at least one relay device to perform initial connection with an external device and displaying the list on a display, based on a relay device being selected from the list, transmitting an access request for the selected relay device to the selected relay device, based on receiving access approval information from the relay device, displaying, on the display, a list of at least one external device capable of performing connection by the relay device, based on one external device from a list of the at least one external device being selected, receiving an authentication request for the selected external device from the selected external device, and based on receiving a user input in response to the authentication request, performing the initial connection with the selected external device may be performed.

The machine-readable storage medium may be provided in the form of a non-transitory storage medium. Here, "non-transitory" means that the storage medium does not include a signal and is tangible, but does not distinguish whether data is permanently or temporarily stored in a storage medium.

According to embodiments of the disclosure, a method disclosed herein may be provided in a computer program product. A computer program product may be traded between a seller and a purchaser as a commodity. A computer program product may be distributed in the form of a machine-readable storage medium (e.g., a compact disc (CD)-read only memory (ROM)) or distributed online through an application store (e.g., PlayStore™, AppStore™). In the case of on-line distribution, at least a portion of the computer program product may be stored temporarily or at least temporarily in a storage medium, such as a manufacturer's server, a server in an application store, a memory in a relay server, or the like.

Each of the components (for example, a module or a program) according to the embodiments may be including one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an electronic device, the method comprising:
   obtaining a list of at least one relay device to perform initial connection with an external device and displaying the list on a display;
   based on a relay device being selected from the list, transmitting an access request for the selected relay device to the selected relay device;
   based on receiving access approval information from the relay device, displaying, on the display, a list of at least one external device capable of performing connection by the relay device;
   based on one external device from a list of the at least one external device being selected, receiving an authentication request for the selected at least one external device from the selected at least one external device;
   based on receiving a user input in response to the authentication request, performing the initial connection with the selected at least one external device;
   based on the initial connection with the selected at least one external device, displaying a user interface (UI) for controlling the external device on the display;
   based on a command to control the external device being input through the UI, controlling the external device to correspond to the command;
   requesting log information about the connected external device to the relay device; and
   receiving log information about the connected external device from the relay device,
   wherein, when communication protocols between the electronic device and the external device are different from each other, the controlling of the external device further comprises:
      receiving state packet information about the connected external device from the relay device;
      based on a command to control the external device being input through the UI, obtaining command packet information corresponding to the command based on the received state packet information; and
      transmitting the obtained state packet information to the relay device.

2. The method of claim 1,
   wherein the selected relay device is configured to perform communication with the selected at least one external device through a near field communication, and
   wherein the list of the at least one external device is a list about an external device capable of performing near field communication with the selected relay device.

3. The method of claim 1, wherein the obtaining of the list comprising the at least one relay device and displaying the list on the display comprises obtaining the list of the at least one relay device and the list of at least one external device capable of communicating with each of the at least one relay device.

4. The method of claim 1, wherein the transmitting of the access request to the selected relay device further comprises:
   based on one relay device being selected from the list of the at least one relay device, requesting an authentication key for the selected relay device to an external server;
   receiving an authentication key for the selected relay device from the external server; and
   based on the authentication key, transmitting an access request for the selected relay device to the selected relay device.

5. The method of claim 1, wherein the receiving of the authentication request from the selected at least one external device further comprises:
 based on one external device being selected from the list of the at least one external device, transmitting an initial connection request for the selected at least one external device to the relay device; and
 based on the initial connection request being approved from the relay device, receiving the authentication request for the selected at least one external device from the selected at least one external device.

6. The method of claim 5,
 wherein, based on the initial connection request being transmitted to the relay device, whether the electronic device performs an initial connection with the selected at least one external device by the relay device is identified, and
 wherein, based on identifying that the electronic device is to perform an initial connection with the external device, transmitting an initial connection request for the selected at least one external device from the relay device to the selected at least one external device.

7. The method of claim 6, wherein, whether the electronic device is to perform connection with the selected at least one external device is identified by at least one of whether the electronic device is pre-registered as a device connectable to the selected at least one external device or whether the selected at least one external device is a device requiring security.

8. The method of claim 1, further comprising:
 based on the initial connection with the selected at least one external device, displaying a user interface (UI) for controlling the external device on the display; and
 based on a command to control the external device being input through the UI, controlling the external device to correspond to the command.

9. The method of claim 8, further comprising:
 wherein, when communication protocols between the electronic device and the external device are different from each other, the controlling the external device further comprises:
  receiving state packet information about the connected external device from the relay device;
  based on a command to control the external device being input through the UI, obtaining command packet information corresponding to the command based on the received state packet information; and
  transmitting the obtained state packet information to the relay device.

10. An electronic device comprising:
 a communicator;
 a display;
 memory comprising at least one instruction; and
 at least one processor connected to the communicator, the display, and the memory, and configured to control the electronic device,
 wherein the at least one instruction, when executed by the at least one processor, causes the electronic device to:
  obtain a list of at least one relay device to perform initial connection with an external device and control the display to display the obtained list on the display,
  based on a relay device being selected from the list, control the communicator to transmit an access request for the selected relay device to the selected relay device,
  based on receiving access approval information from the relay device, control the display to display, on the display, a list of at least one external devices capable of connection by the relay device,
  based on one external device among a list of the at least one external device being selected, receive an authentication request for the selected at least one external device from the selected at least one external device,
  based on receiving a user input in response to the authentication request, perform an initial connection with the selected at least one external device,
  based on the initial connection with the selected at least one external device, display a user interface (UI) for controlling the external device on the display,
  based on a command to control the external device being input through the UI, control the external device to correspond to the command,
  request log information about the connected external device to the relay device, and
  receive log information about the connected external device from the relay device, and
 wherein, when communication protocols between the electronic device and the external device are different from each other, wherein the at least one instruction, when executed by the at least one processor, causes the electronic device to:
  receive state packet information about the connected external device from the relay device,
  based on a command to control the external device being input through the UI, obtain command packet information corresponding to the command based on the received state packet information, and
  transmit the obtained state packet information to the relay device.

11. The electronic device of claim 10,
 wherein the selected relay device is configured to perform communication with the selected at least one external device through a near field communication, and
 wherein the list of the at least one external device is a list about an external device capable of performing near field communication with the selected relay device.

12. The electronic device of claim 10, wherein the at least one instruction, when executed by the at least one processor, further causes the electronic device to obtain the list of the at least one relay device and the list of at least one external device capable of communicating with each of the at least one relay device.

13. The electronic device of claim 10, wherein the at least one instruction, when executed by the at least one processor, further causes the electronic device to:
 based on a relay device being selected from the list of the at least one relay device, request an authentication key for the selected relay device to an external server,
 receive an authentication key for the selected relay device from the external server, and
 based on the authentication key, transmit an access request for the selected relay device to the selected relay device.

14. The electronic device of claim 10, wherein the at least one instruction, when executed by the at least one processor, further causes the electronic device to:
 based on one external device being selected from the list of the at least one external device, transmit an initial connection request for the selected at least one external device to the relay device through the communicator, and
 based on the initial connection request being approved from the relay device, receive the authentication request for the selected at least one external device from the selected at least one external device through the communicator.

\* \* \* \* \*